United States Patent [19]

Stafford

[11] 3,811,155
[45] May 21, 1974

[54] ROPE GRAB ASSEMBLY

[76] Inventor: Lawrence R. Stafford, 8 Gracemore St., Albany, N.Y. 12203

[22] Filed: June 21, 1972

[21] Appl. No.: 264,877

[52] U.S. Cl............................ 24/115 G, 403/355
[51] Int. Cl............................................. F16g 11/00
[58] Field of Search........ 24/126 R, 134 E, 134 EA, 24/263 LL; 182/5; 188/65.1

[56] References Cited
UNITED STATES PATENTS
3,492,702  2/1970  Stafford ........................... 24/126 R
3,317,971  5/1967  Meyer............................. 24/134 E
2,638,618  5/1953  Legge.............................. 24/126 R Primary Examiner—James T. McCall
Assistant Examiner—Darrell Marquette
Attorney, Agent, or Firm—Cushman, Darby & Cushman

[57] ABSTRACT

The disclosure relates to a line or cable gripping device of the releasable type used to support a load at a desired point along the line and includes first and second bracket plate members that are U-shaped in cross-section; the second bracket member has dimensions such that it can be slidably positioned within the first bracket member; the bracket members are each formed with pairs of alignable slots for receiving a key member; the slots of the second smaller, bracket member are elongated relative to the slots of the first larger, bracket members so that, when the key member occupies the slots of the bracket members, the direction of sliding motion of one bracket number relative to the other is defined by the position of the slots of the smaller bracket member and the surface of the key member. A lever is pivotably mounted in the second bracket member and spring means are provided for biasing the lever into engagement with the key member whereby the connecting portions of the two U-shaped bracket members will be maintained in a line gripping position relative to one another.

5 Claims, 4 Drawing Figures

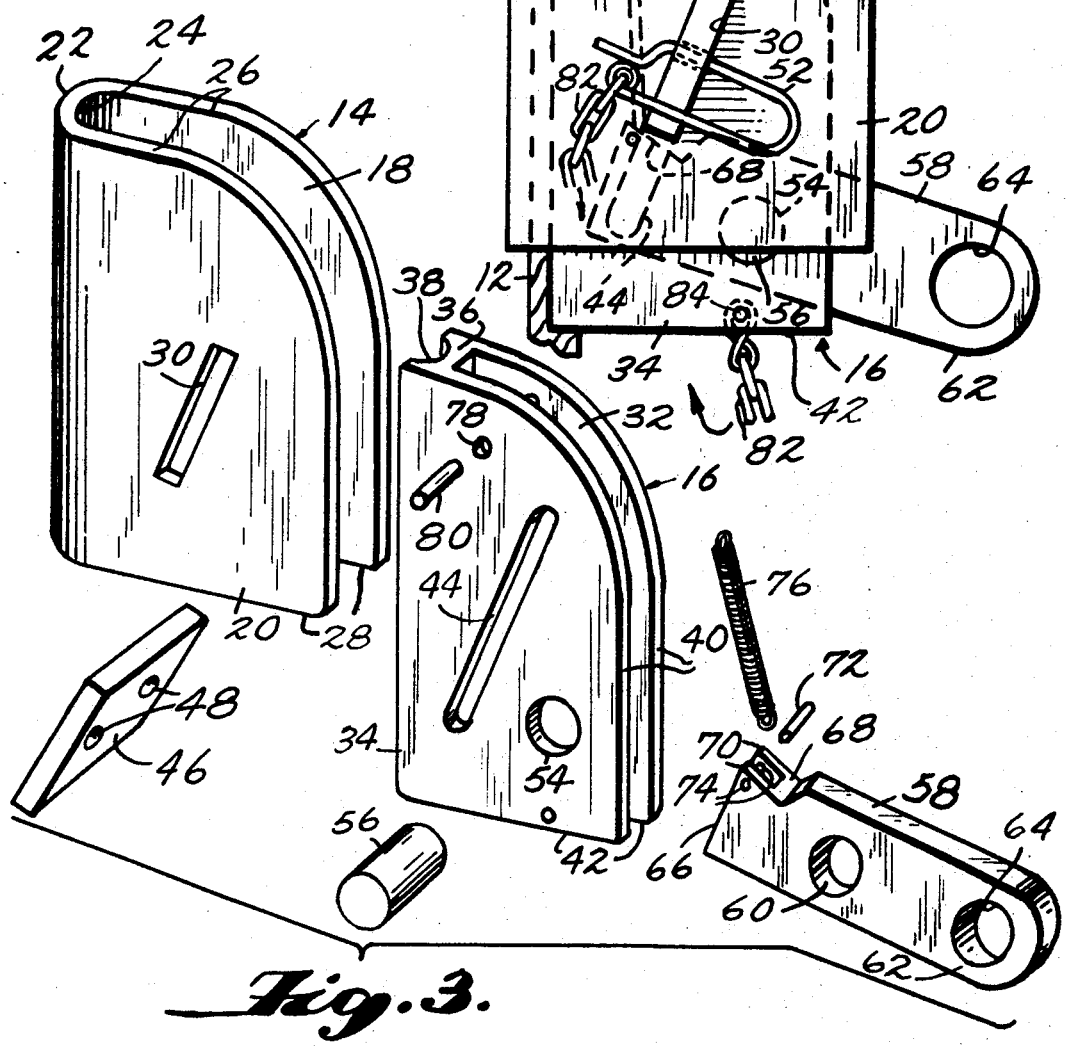

ROPE GRAB ASSEMBLY

BACKGROUND OF THE INVENTION

This invention relates to line gripping devices which are releasably mountable on a line or cable to support a load and, more specifically, to an improved line gripping device which can be easily mounted on a cable at any desired point and tightly grip the cable to a degree commensurate with a load which is supported by the device.

In U. S. Pat. No. 3,492,702, granted Feb. 3, 1970 to the same inventor, there is disclosed a releasable line gripping device which automatically grips the line under no load conditions and more positively grips the line whenever a load is applied to the device. Whereby the device itself serves as an anchor and a support for loads. Such devices are particularly useful for connecting the life belt of a workman to safety lines but can also be employed to position scaffolds, platforms, or the like, on cables. The device of the aforementioned patent includes a one-piece bracket having a pair of substantially parallel side plates joined along one edge thereof so that the bracket is substantially U-shaped in cross section. The side plates of the U-shaped bracket were spaced apart a distance approximately equal to the diameter of the line or cable to which the device was intended to be attached. A wedge plate was formed to be received between the parallel side plates of the bracket and which was provided with a clamping side edge disposed to face the U-shaped bracket portion. One end of the wedge plate extended beyond the corresponding end of the bracket to a substantial degree. On the projecting portion of the wedge plate a bifurcated camming lever was pivotably mounted and spring biased to rotate to engage the adjacent edges of the plates of the one-piece bracket. An inclined, elongated slot was provided in the wedge plate through which was fitted a key element so that the biased pivotting of the camming lever would function to move the wedge plate into a line gripping position relative to the U-shaped connecting portion of the bracket member.

While the device disclosed in my prior patent has proved effective for its intended purpose, it has been found that is has suffered from the disadvantage that it will only accommodate a limited range of cable diameters by virtue of the positioning of the camming lever exteriorly of the one-piece bracket thereby limiting the extent to which the wedge plate can be moved away from the U-shaped connecting portion of the one-piece bracket. Also, it was possible, with my prior device for the camming lever and, hence, the wedge plate, to become locked in the gripping position when, for example, a sudden heavy load was applied to the lever sufficient to cause compression of the cable material beyond an acceptable amount. As a result, in such instances, release of the device would become very difficult since the lever would become jammed against the edges of the one-piece bracket.

The arrangement of the elements of the gripping device of the present invention, however, avoids the foregoing disadvantages and, in addition, the device of this invention is more economical to manufacture by remaining mechanically simple yet will provide effective, safe gripping action.

SUMMARY OF THE INVENTION

The line grip device of this invention is constructed with a one-piece main or outer bracket similar to that used in my aforementioned patent, but with a wedge bracket that is itself constructed with parallel side plates joined along one edge thereof by a U-shaped connector portion, the side plates being spaced apart a distance so that the wedge bracket member can slidably interfit with the main bracket. A lever is pivotably mounted between the parallel plates of the wedge bracket and is spring biased. The main or outer bracket is provided with outwardly inclining slots for receiving a key plate and the inner or wedge bracket is provided with parallel extending, inclined, elongated slots which slope away from the clamping edges of the outer and wedge bracket. With the elements of the gripping device assembled, the lever will pivot, under the bias force of the spring mounted on the wedge bracket, to engage the key plate to thereby move the wedge bracket and its line gripping edge toward the gripping edge of the outer bracket to thereby grab a cable or line disposed therebetween. Since the lever is no longer located exteriorally of the wedge bracket as was the case in my prior gripping device, the assembled brackets have a greater range of relative movement so that a greater range of rope diameters can be accommodated between the gripping edges of the two bracket members since the only material limitation on the size of the cable receiving space has been eliminated. It will be clear, of course, that the length of the slot in the wedge bracket will correspondingly be increased so as to render this device capable of utilizing the increased range of movement of the wedge bracket itself.

As with my prior grip device, the present device can be utilized with lines made of fiber, metal or plastic. Because of its light weight and easy manipulability, it is especially useful for attaching a workman's safety strap to a safety line. The device can be easily moved by the workman when necessary and will instantly grip the line due to the fact that the wedge bracket will move into gripping relationship with the outer bracket the instant a load is exerted on the lever.

It is an object of this invention to provide a gripping device that is more economical to manufacture than the devices of the prior art and yet which can be easily installed where desired on a line and which will automatically and effectively grip the line to provide support when a load is applied thereto.

Additionally, the present invention provides a rope grab device which is not subject to jamming and the structure of which provides reinforcement for the actuating lever. This latter feature is particularly important since, as with my prior device, the lever was the element that was first subjected to force in the event that a workman lost his footing. Since the lever of my prior device was held in place only by a rivet, it was necessary to construct it of extremely hard steel so as to render it capable of withstanding sudden heavy loads. In the arrangement of the present invention, however, the lever is retained between a double set of parallel plates as well as by a rivet so that the lever is substantially less exposed to twisting or bending forces that may occur when the device is being used.

The foregoing and other advantages will become apparent as consideration is given to the following description and accompanying drawings.

BRIEF DESCRIPTION OF THE DRAWINGS

FIG. 1 is an end view of the line grip device of the present invention;

FIG. 2 is a side elevation view of the line grip of FIG. 1;

FIG. 3 is an exploded view showing the elements of the line gripper; and

FIG. 4 is an illustration of the removable safety fastener which is attached to the key plate when the device is assembled.

DETAILED DESCRIPTION OF THE INVENTION

In the drawings FIGS. 1 and 2 illustrate the gripping device 10 of the present invention in assembled form and gripping a line or cable 12. The device 10 consists of a main or outer bracket 14 and an inner or wedge bracket 16.

As shown more clearly in FIG. 3, the main bracket 14 consists of two, substantially parallel extending side plates 18 and 20 and a connecting portion 22 which joins the side plate 18 and 20 along one edge, respectively, thereof so that the main bracket 14 is generally U-shaped when viewed as in FIG. 1. The side plates 18 and 20 may be spaced apart a distance approximately equal to the diameter of a line 12 being received within the connection portion 22. However, as will be pointed out hereinafter, the distance between the plates 18 and 20 may be selected to accommodate a larger cable diameter since gripping action of the device 10 of the present invention will be sufficiently effective for a range of smaller cable diameters thus avoiding the necessity of providing a different gripping device for cables or lines of differing diameters. If desired, the interior surface 24 of connecting portion 22 may be roughened to improve the gripping effectiveness of the device 10. The free edges 26 of plates 18 and 20 extend initially substantially perpendicularlly from connecting portion 22 and then curve to extend substantially parallel to the connecting portion 22 towards the rear edges 28 of bracket 14. Each side plate 18 and 20 have key receiving means in the form of confronting key-receiving slots 30 located centrally therein, which are inclined outwardly and upwardly from the bracket rear edges 28 at an angle of about 22.5° with respect to connecting portion 22.

The wedge bracket 16 is constructed in a manner similar to that of the main bracket 14 and consists of substantially parallel extending side plate 32 and 34. The side plates 32 and 34 are joined together by a connecting portion 36 which on its exterior has a part cylindrically curved clamping edge 38 extending along the entire length of the wedge bracket 16. As noted previously with respect to the surface 24 of main bracket 14, the clamping edge 38 of the inner or wedge bracket 16 may also be roughened to increase the gripping efficiency of the device 10. The side plates 32 and 34 are, of course, spaced apart a distance such that the wedge bracket 16 will slidably interfit between side plates 18 and 20 of the main bracket 14 as shown in FIG. 1. With the device assembled as shown in FIGS. 1 and 2, the clamping edge 38 of the wedge bracket 16 will confront the interior surface 24 of the connecting portion 22 of the main bracket 14 to define a cable receiving space therebetween. The free edges 40 of wedge bracket 16 extend from the front of the connecting portion 36 and curve smoothly to extend substantially parallel to the connection portion 36 to the rear edges 42 of the plates 32 and 34. The overall length of wedge bracket 16 as measured along the connecting portion 36 is substantially the same as that of the main bracket 14 while the height dimension as measured by the extent of rear edges 42 is slightly less than that of the main bracket 14 as shown in FIG. 2.

Each of the side plates 32 and 34 of the wedge bracket 16 have elongated slots, one of which is shown at 44, formed therethrough which extend at an acute angle away from the clamping edge 38. It is necessary, of course, that the direction of slots 44 relative to the clamping edge 38 be the same as the angular orientation of the key-receiving slots 30 in side plates 18 and 20 of main bracket 14. In addition, in the arrangement of the present invention, the slots 44 are longer than the slots 30 and may extend from a point closely adjacent to rear edges 42 to a point closely adjacent to the curved portion of the free edges 40. It will be obvious to those skilled in this art, of course, that, if slots 44 extend too closely to the edges 40 and 42, the structural integrity of the wedge bracket will be weakened. Correspondingly, however, this limitation on the length of the slots 44 may be diminished by using very rigid material such as cold rolled stainless steel.

The width of the slots 44 and 30 are substantially the same and are dimensioned so that a key plate 46 may be passed therethrough as shown in FIGS. 1 and 2. It is important that the dimensions of the slot 30 in main bracket 14 be such that the key plate 46 when inserted into the slots 30, will not be free to move about. The key plate 46 is provided with apertures 48 adjacent the outer edges for the retaining elements such as a wire ring 50 and removable fastener 52 (FIG. 4).

Side plates 32 and 34 of wedge bracket 16 are also provided with aligned apertures, one of which is shown at 54 through which a rivet or pin 56 is disposed and is permanently fixed. This may be done as by force fitting or welding or the like. The ends of the pin 56 are flush with the exterior surfaces of the plates 32 and 34, respectively.

An actuating member in the form of a lever 58 which is provided intermediate its ends with a bore 60 is placed between the side plates 32 and 34 so that when the pin or rivet 56 is secured in the apertures 54 the pin or rivet 56 will pass through bore 60 whereby the lever 58 will be pivotably mounted for rotation about the pin 56 between side plates 32 and 34 of the wedge bracket 16. End 62 of lever 58 is provided with a bore 64 for the purposes of permitting a pivotable connection with a link (not shown) which can be pin mounted through bore 64 for connection with a load or other connection devices. The opposite end 66 of lever 58 is formed with a recess portion 68 having spaced flanges 70. A pin 72 is securely fastened in bore 74 to extend between the flanges 70. The pin 72 serves to anchor one end of a coil spring 76 which is illustrated in its unextended state in FIG. 3. Side plates 32 and 34 of wedge bracket 16 are provided with aligned bores, one of which is indicated at 78, and in which is securely fastened the end of a pin 80. The pin 80 serves to anchor the other end of coil spring 76 when the device is assembled as illustrated in FIGS. 1 and 2.

Mounting of the line gripper 10 on a cable is achieved as follows. First, the cable or line 12 is placed in contact with the interior surface 24 of the main bracket 14 and then the wedge bracket 16 is slid between the side plate 18 and 20 of the main bracket 14. Next, the lever 58 is pivotted counter-clockwise as viewed in FIG. 2 against the force of spring 76 to permit the key plate 46 to be located in the slots 30 and 44 of the bracket members 14 and 16. It should be apparent, of course, that the slots 30 and 44 of the bracket members 14 and 16 must first be aligned so that the key plate 46 may be inserted completely therethrough to the position illustrated in FIG. 1. Release of the lever 58 will then permit the lever to rotate in a clockwise direction as viewed in FIG. 2 about pin 56 under the force of spring 76 whereupon the recess portion 68 will come into contact with a side edge of key plate 46 as shown in FIG. 2. The constant force exerted on the lever 58 by the spring 76 will tend to maintain the wedge bracket 16 in a line gripping position as illustrated in FIG. 2 since the wedge bracket 16 will slide on the key plate 46 along a path defined by the slots 44 located in the side plates 32 and 34 of the wedge bracket 16. It will be apparent that any added load acting in a clockwise direction on end 62 of lever 58 will increase the gripping force on the cable 12 and, conversely, rotation as by an operators hand of the lever 58 in a counter-clockwise direction as viewed in FIG. 2 about pin 56 will effect release of the cable 12 thus enabling the positioning of the line gripping device 10 along the cable 12.

The wire ring 50 and the safety fastener 52 may be permanently attached to the wedge plate 16 by a chain 82 which is attached to a pin 84 which, in turn, is securely fixed adjacent to rear edges 42 of the wedge bracket 16.

As previously noted, since the major portion of the length of the lever 58 is enclosed between the side plates of both the wedge bracket 16 and the main bracket 14, greater reinforcement for the lever 58 is obtained than was the case with my prior device. An advantage flowing from this arrangement is that the line gripper 10 can be constructed from a lighter material such as aluminum whereas it was necessary to use hard steel in my prior device.

The foregoing has been a description of the preferred embodiment of the present invention and it will be understood that many modification and variations of the present invention can be obtained without departing from the spirit and scope of the invention as defined in the appended claims.

What is claimed is:

1. A grip device for mounting on a line, comprising:

a first bracket including a pair of parallel side plates spaced apart a distance sufficient to receive a line therebetween, said side plates each having one edge rigidly joined together by a connecting portion having an interior surface, a second bracket including a pair of parallel side plates spaced apart a distance to permit said second bracket to slidably fit between said side plates of said first bracket, said side plates of said second bracket each having one edge rigidly joined together by a connecting portion, said connecting portion of said second bracket having an exterior surface defining a clamping edge positioned to face said interior surface of said connecting portion of said first bracket when said second bracket is disposed between said plates of said first bracket, said parallel side plates of said second bracket each having an elongated slot therein extending away from said clamping edge at an acute angle, said slots being aligned with each other, said first bracket having key receiving means in its said side plates, key means positionable in said key receiving means and said slots in said plates of said second bracket, a lever pivotably mounted at a point intermediate its ends between said side plates of said second bracket, said second bracket having spring means connected to one end of said lever to constantly urge a portion of said lever between said point and said one end of said lever into engagement with said key means positioned in said key receiving means so that said second bracket will slide on said key means and move said clamping edge toward said interior surface of said first bracket to grip a line disposed therebetween.

2. The device as claimed in claim 1 wherein said clamping edge of said second bracket is concave along its length.

3. The device as claimed in claim 1 wherein said key receiving means in said side plates of said first bracket comprise a pair of aligned slots which extend away from said interior surface of said first bracket at an acute angle.

4. The device as claimed in claim 3 wherein said key means comprises a plate member shaped to closely interfit with said slots in said side plates of said first bracket.

5. The device as claimed in claim 4 wherein said slots formed in said side plates of said second bracket are formed with substantially the same width as said slots in said side plates of said first bracket while the length of said slots in said side plates of said second bracket are longer than the slots in said side plates of said first bracket.

* * * * *